United States Patent [19]

Carver

[11] Patent Number: 5,318,450

[45] Date of Patent: Jun. 7, 1994

[54] MULTIMEDIA DISTRIBUTION SYSTEM FOR INSTRUCTIONAL MATERIALS

[75] Inventor: Keith E. Carver, Camarillo, Calif.

[73] Assignee: GTE California Incorporated, Thousand Oaks, Calif.

[21] Appl. No.: 440,143

[22] Filed: Nov. 22, 1989

[51] Int. Cl.$^5$ .............................................. G09B 7/00
[52] U.S. Cl. .................................. 434/336; 434/307; 434/335; 434/350; 348/8; 370/124; 455/3.1
[58] Field of Search ............................. 434/322-324, 434/307, 308, 335, 336, 350; 358/86, 93, 189, 181; 370/73, 124, 69.1; 455/3-5, 3.1-5.1

[56] References Cited

U.S. PATENT DOCUMENTS

| | | | |
|---|---|---|---|
| 3,882,538 | 5/1975 | Lowe | 434/307 X |
| 4,715,818 | 12/1987 | Shapiro et al. | 434/323 X |
| 4,759,717 | 7/1988 | Larochelle et al. | 434/336 X |
| 4,768,087 | 8/1988 | Taub et al. | 358/84 |
| 4,885,747 | 12/1989 | Foglia | 370/124 X |
| 4,891,633 | 1/1990 | Imazeki et al. | 370/124 X |
| 4,907,146 | 3/1990 | Caporali | 434/336 X |

Primary Examiner—Richard J. Apley
Assistant Examiner—Joe H. Cheng
Attorney, Agent, or Firm—John A. Odozynski

[57] ABSTRACT

An automated classroom which integrates sources of video instructional materials, such as TV, CATV, VCR, video disk players, closed circuit TV, and the like, with sources of computer-based instructional materials is disclosed. Modulated video sources are converted to baseband and applied, along with baseband video sources, to a multichannel modulator or headend. The headend drives a local video network (LVN) which couples to a plurality of student workstations and to an instructor workstation. In addition a local area network (LAN) couples to the student workstations, the instructor workstation, and to a file server. Each of the instructor and student workstations includes a computer, a monitor control unit (MCU), a video display, and an audio transducer. The workstation computers couple to the LAN and the workstation MCU's couple to the LVN. A curriculum delivery system (CDS), located on the file server, causes computer-based instructional materials to be transferred from the file server through the LAN to selected ones of the student workstations, in which case such student MCU's route computer-based video and audio to their associated video displays and audio transducers. Additionally, under the control of the CDS through student computers and student MCU's, video instructional materials from the LVN may be displayed on video displays and audio transducers of selected ones of the student workstations. As a result of this system, student learning is interactive, individualized, and personalized in a multimedia environment.

9 Claims, 2 Drawing Sheets

MULTIMEDIA DISTRIBUTION SYSTEM FOR INSTRUCTIONAL MATERIALS

TECHNICAL FIELD OF THE INVENTION

The present invention relates generally to educational devices and systems. More specifically, the present invention relates to automated systems which deliver instructional materials to students in a classroom environment.

BACKGROUND OF THE INVENTION

Conventionally, the bulk of instructional materials presented to students in a classroom environment has been presented by a teacher. Educators generally recognize that this conventional technique suffers many drawbacks which hinder a student's education. For example, all students in a single classroom receive the same instructional materials, and a conventional curriculum structures such common instructional materials for a hypothetical average student. The teacher typically modifies the instructional materials to compensate for differences between the teacher's actual students and the hypothetical student. Nevertheless, a large portion of the students are poorly served by the receipt of instructional materials which are beneath such students' levels of development, skill, learning, and education in the subject matter being taught. And, another large portion of the students are poorly served by the receipt of instructional materials which are above such students' levels of development in the subject matter being taught. Consequently, many students are frustrated at the instructional information they receive for one reason or another, and their education suffers as a result.

Other drawbacks to the conventional instructional material delivery techniques hinder a student's education. For example, a particular teachers' experience with the subject matter being taught may handicap the educational process. Generally speaking, education suffers when a teacher with less experience in a particular subject is required to present the instructional materials when compared to a teacher who has more experience.

Moreover, conventional techniques are severely limited for students who are visual learners as to the degree of visualization which may be presented in connection with instructional materials. Specifically, the more pictures and graphical representations, the more detail provided in such pictures and graphical representations, and the more realistic the presentation of such pictures and graphical representations, the more effective the educational process becomes. However, the limited number of static pictures or graphical representations contained in typical textbooks, when augmented by conventional chalkboard drawings falls far short of the degree of visualization needed to effectively present instructional materials in many subjects and for many students.

Limited solutions to each of these problems are known. For example, interactive computer-based software tutorial or training systems have been devised in which individual students may receive instructional materials via a computer. Such systems permit a student to receive the instructional materials which are appropriate for the student's level of expertise and to progress at the individual student's rate. When each student in a classroom has a computer programmed with a software training system, each student can receive his or her own individual lessons, and the instructional materials of those lessons can be especially tailored for each student. However, prior art computerized classroom systems are inadequate for teachers because they often fail to provide a controlling system which adequately manages the distribution and operation of instructional materials. For example, many conventional computerized classroom systems do not have the flexibility to pull together information from a variety of sources and manage this variety of instructional material. Teachers must therefore spend an undesirable amount of effort and time assimilating data rather than attending to teaching duties.

Moreover, modern classrooms are beginning to increase the use of educational video tapes, laser video disks, VHF and UHF TV, "live" video via camcorders, closed circuit TV, satellite TV, and CATV to augment instructional materials provided by a teacher. Such video resources provide improved visualization of the concepts being taught. As a result, the educational process improves to a limited degree. In addition, such resources are typically prepared and produced for wide dissemination. Typically, such resources are prepared by those who fully understand the subject matter presented and have a good feel for presenting the instructional materials in an understandable way. Thus, the educational process is enhanced. However, prior art video resource systems typically present their instructional materials to an entire classroom in a single setting or to one group of students physically located near a video machine. Consequently, such materials are not individualized for each student's needs but to a group's need. Moreover, such materials cannot be incorporated into an individual lesson with computer-based instructional materials.

SUMMARY OF THE INVENTION

Accordingly, it is an advantage of the present invention that a system is provided which integrates computer and video resources together in a classroom environment.

Another advantage of the present invention is that a system for managing the delivery of video and computer-based instructional materials in an automated classroom is provided.

Yet another advantage is that the present invention provides a system which delivers individually tailored computer-based and video instructional materials to students in a classroom environment.

The above and other advantages of the present invention are carried out in one form by a system which distributes video and computer-based instructional materials. The system includes a plurality of workstations for use by students. Each of the student workstations includes a video monitor. The system additionally includes a video source, which supplies the video instructional material, and a file server, which supplies the computer-based instructional material. A network couples each of the student workstations to the video source and to the file server. At each of the student workstations, a controller couples to the workstation's video monitor. The controller causes the video monitor of the student workstation to display either the video instructional materials or the computer-based instructional materials.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
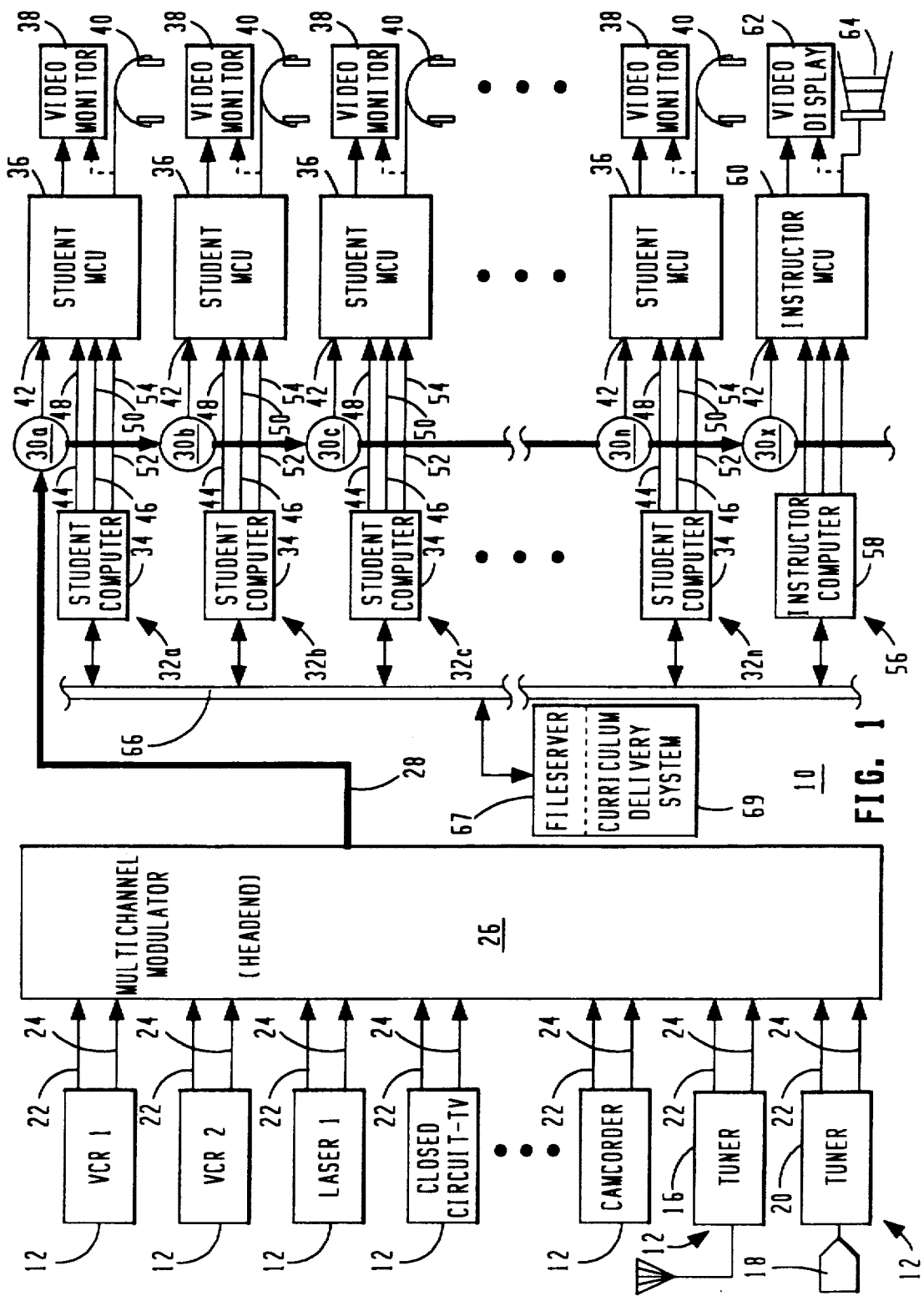
FIG. 1 shows a block diagram of a multimedia distribution system for instructional materials constructed in accordance with the present invention.

FIG. 1 shows a block diagram of an automated classroom 10. In the preferred embodiment, automated classroom 10 resides in a single room. Nevertheless, the various components of classroom 10 (discussed below) may reside within several separate rooms. Classroom 10 includes a plurality of video sources 12. Video sources 12 include a diverse assortment of devices which generate baseband video signals. For example, video sources 12 may include one or more of VCR's, laser disk players, closed circuit TV, camcorders, or the like. In addition, video sources 12 may include UHF and VHF video sources, such as a TV antenna 14 coupled through a tuner 16, a CATV connection 18 coupled through a tuner 20, or a satellite connection (not shown). In the preferred embodiment, each of video sources 12 represents a conventional source of video signals. Consequently, automated classroom 10 receives video instructional material from a plurality of existing video information media, such as VCR tapes, laser disks, closed circuit TV from a remote classroom, and public and private video broadcasts. Moreover, each of such video media may simultaneously supply video signals for classroom 10.

In the preferred embodiment, each of video sources 12 has a video output 22 and an audio output 24. Audio signals, which are supplied at audio outputs 24, represent baseband audio electrical signals which are synchronized with the video signals that are supplied at corresponding video outputs 22. Outputs 22 and 24 couple to inputs of a multi-channel TV modulator or headend 26.

Headend 26 represents a conventional multi-channel modulator, which in the preferred embodiment is provided by one or more of model VM-100/ multi-channel TV modulators manufactured by the Nexus Engineering Corporation of Burnaby, British Columbia, Canada. Consequently, headend 26 modulates each of the baseband signals supplied by video sources 12 into its own discrete video channel. An output of headend 26 drives a broadband local video network (LVN) 28. In the preferred embodiment, LVN 28 is formed using a coaxial cable similar to cables used to transmit cable TV signals, and a plurality of taps 30, individually referenced as taps 30a, 30b, 30c, and so on through 30n, and 30x in FIG. 1.

LVN 28 couples to each of student workstations 32a, 32b, 32c, and so on through 32n (collectively referenced as student workstations 32) through taps 30a, 30b, 30c, and so on through 30n, respectively. Although the preferred embodiment outfits a conventional classroom with approximately thirty of student workstations 32, the precise number of student workstations accommodated by classroom 10 is immaterial, and may be as low as only one workstation. In addition, student workstations 32 are not limited to only one classroom. Each of student workstations 32 includes a student computer 34, a student monitor control unit (MCU) 36, a video monitor 38, and a headset 40. Taps 30 couple to LVN input ports 42 of student MCU's 36 within each of student workstations 32 so that video instructional material is provided to MCU's 36 for individual processing at each of student workstations 32.

In the preferred embodiment, student computers 34 are substantially identical to one another, and each represents a conventional personal computer. Specifically, in the preferred embodiment each of student computers 34 is an IBM PC/XT or compatible personal computer. Each of student computers 34 includes a keyboard (not shown), video monitor driving circuits (not shown), printer driving circuits (not shown), and may include a hard disk drive (not shown), a floppy disk drive (not shown), a voice synthesizer (not shown), and/or an internal speaker (not shown). All of these personal computer components are conventional in nature.

In addition, student computers 34 each have a parallel data output port 44 and a video output port 46. Data output port 44 is conventionally referred to as a parallel printer port and is conventionally utilized by a personal computer to provide data to a printer. However, in the preferred embodiment of the present invention, data output port 44 does not couple to a printer. Rather, data output port 44 couples to a data input port 48 of an MCU 36 within each student workstation 32. Of course, nothing prevents student workstations 32 from additionally including a printer if desired.

For each of student computers 34, video output port 46 represents a conventional digitized video output. Although the preferred embodiment supplies a conventional CGA video output, for purposes of the present invention video output port 46 may provide data in any conventional monochrome or color, text or graphic, or pixel density format, whether mono, CGA, EGA, VGA, PGA, or the like. Video output port 46 couples to a computer video input port 50 of an MCU 36 for a corresponding student workstation 32.

In addition, each of student computers 34 may optionally have a computer audio output 52. Computer audio output 52 may come from a voice synthesizer card (not shown). Alternatively, computer audio output 52 may couple to an internal speaker (not shown) of student computer 34 so that when an electrical connection is made to a computer audio input 54 of an MCU 36 for the associated student workstation 32, the speaker becomes disabled. Regardless, in the preferred embodiment student computers 34 do not emit audible sounds but provide audio signals at audio output 52.

Each of student MCU's 36 in classroom 10 is substantially identical to the others in the preferred embodiment of the present invention. An MCU 36 receives a plurality of video and corresponding audio signals from LVN 28 along with a video and corresponding audio signal from its associated student computer 34. Data received at data input port 48 cause MCU 36 to tune or select only one of these video and audio signal pairs, to properly format the selected video and audio signal pair, and to present the properly formatted video and audio signal pair to an associated video monitor 38 for display and to an associated headset 40 for conversion into audible sounds. The audio signal may also be delivered to and selectively broadcast from video monitor 38 by a speaker (not shown) therein. MCU 36 is discussed in more detail below in connection with FIG. 2.

As shown in FIG. 1, the preferred embodiment of classroom 10 additionally includes at least one instructor workstation 56. Instructor workstation 56 includes an instructor computer 58, an instructor MCU 60, a video display 62, and an audio transducer 64. Instructor workstation 56 is similar in structure to student workstations 32 except that instructor workstation 56 may include additional features. Specifically, instructor computer 58, instructor MCU 60, video display 62 and audio transducer 64 couple together and to LVN 28 at tap 30x in the same manner as discussed above for student computer 34, student MCU 36, video monitor 38, and headset 40, respectively. However, instructor computer 58 may have an additional printer port (not shown) and a printer associated therewith. Video display 62 may have a small personal video monitor for individual viewing by an instructor, a large screen display for viewing by all students in a room, or both. Likewise, audio transducer 64 may have a headset for individual listening by an instructor, a loudspeaker with appropriate amplifiers so that all students in a room may hear audio, or both. In the preferred embodiment, instructor MCU 60 is substantially identical to student MCU's 36.

As shown in FIG. 1, each of instructor computer 58 and student computers 32 additionally couples to a local area network (LAN) 66. LAN 66 represents a conventional data communications network which permits transmission of computer data among the various nodes coupled thereto. In the preferred embodiment, a conventional ETHERNET LAN serves as LAN 66. In addition, a file server 67 couples to LAN 66. In the preferred embodiment, file server database 67 functions as a conventional mass memory storage device which contains an entire library of computer-based instructional materials, and file server 67 includes curriculum delivery system (CDS) software 69. However, CDS 69 may be physically located at any node on LAN 66, including instructor workstation 56. Consequently, each of file server 67, instructor computer 58, and student computers 32 is in data communication with the others.

In operation, CDS 69 manages lessons, and hence instructional materials, presented at each of student workstations 32. Thus, CDS 69 is programmed to issue lesson transfer commands to the data network of LAN 66. Such programming may be controlled from instructor workstation 56 through LAN 66. Alternatively, such programming may be controlled from any student workstation 32 when an appropriate teacher sign-on code is supplied to the workstation. Such commands cause specified computer-based lessons to be delivered to specified ones of student workstations 32. Students may thereafter operate their student workstations 32 to take the specified lessons. Of course, CDS 69 may route such specified lessons to instructor workstation 56 as well.

In addition, CDS 69 can issue configuration commands to specific student workstations 32. Such configuration commands specify specific video and corresponding audio signals for presentation at video monitor 38 and headset 40 of a specified student workstation 32. For example, an instructor decides or approves which lessons particular students are to receive and communicate this decision to CDS 69. If a first student is to receive a computer-based lesson, then a configuration command may specify that the student workstation 32 with which the first student is associated operate its MCU 36 so that computer video signals and computer audio signals are routed to the associated video monitor 38 and headset 40. Likewise, if a second student is to receive a video lesson from LVN 28, then a configuration command may specify that the student workstation 32 with which the second student is associated operate its MCU 36 so that appropriate video signals and audio signals from LVN 28 are routed to the associated video monitor 38 and headset 40.

Moreover, CDS 69 is programmed, in connection with programming within student computers 34, to utilize LAN 66 to receive data from student workstations 32. Such data may include administrative data, such as attendance and tardiness recording. In addition, such data may include performance data, such as scores from computer-based tests, durations required to progress through specified lessons, and the like. Of course, nothing prevents additional devices from coupling to LAN 66. Such additional devices may include an administrative computer to which an instructor workstation 56 may pass administrative data or a bridge or gateway through which automated classroom 10 may couple to additional automated classrooms 10.

Figure 2:
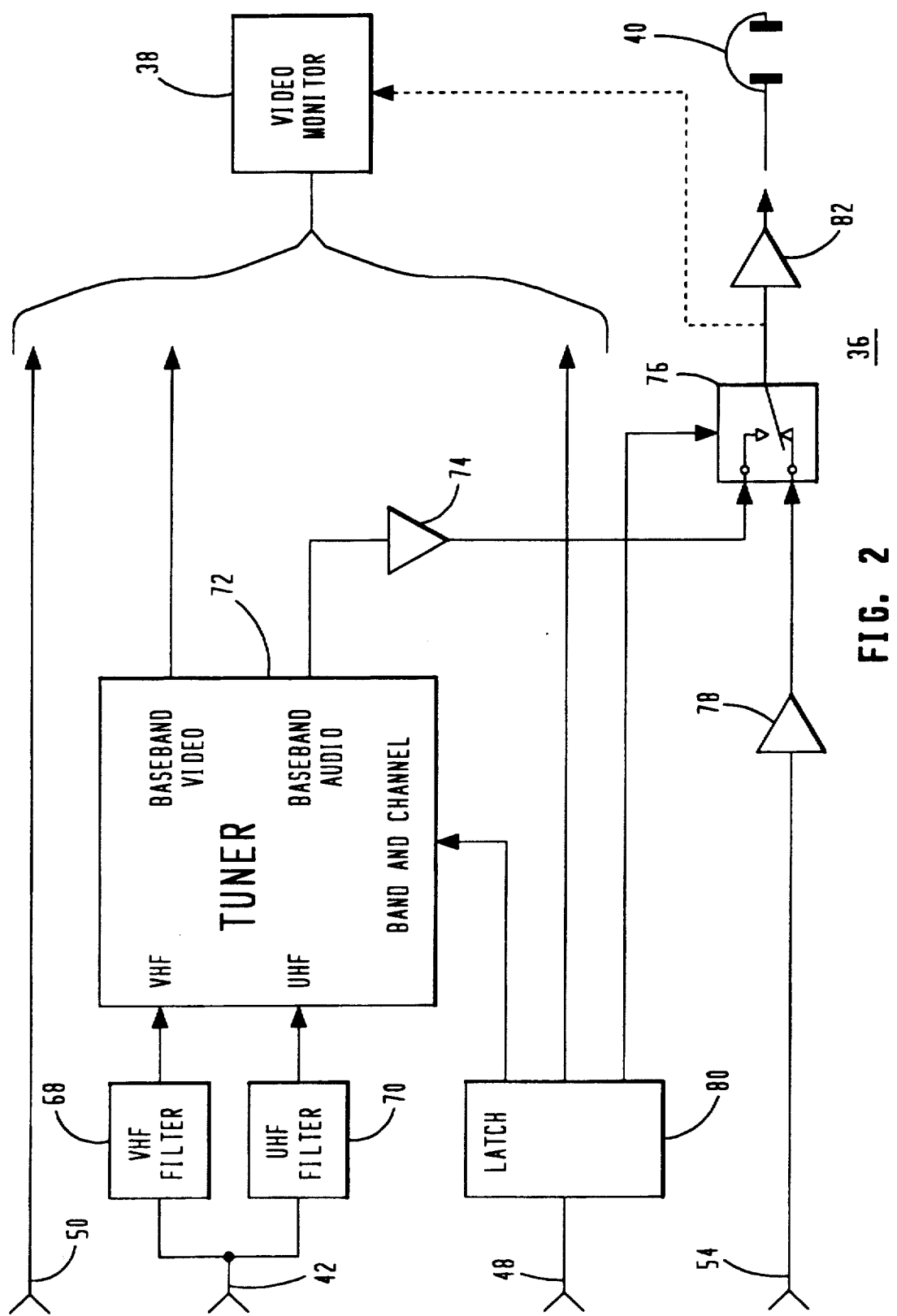
FIG. 2 shows a block diagram of a monitor control unit (MCU) portion of the present invention.

FIG. 2 shows a block diagram of a student MCU 36. Since instructor MCU 60 is substantially identical to student MCU 36 in the preferred embodiment, the discussion of FIG. 2 applies to MCU 60 as well. As shown in FIG. 2, LVN input port 42 couples through a VHF filter 68 and a UHF filter 70 to VHF and UHF inputs, respectively, of a TV tuner circuit 72. VHF filter 68 passes video and audio signals carried within VHF channels, and UHF filter 70 passes video and audio signals carried within UHF channels. Tuner circuit 72 is a conventional tuning circuit similar to those utilized in connection with conventional TV's, VCR's, and the like. Consequently, tuner circuit 72 receives inputs which define a frequency channel for demodulation by tuner circuit 72, and tuner circuit 72 includes all demodulation circuits required to generate baseband video and audio signals from the specified channels.

An audio signal output of tuner circuit 72, which supplies baseband audio signals, couples through an amplifier 74 to a first signal port of an electronically controllable switch 76. Computer audio input 54 couples through an amplifier 78 to a second signal port of switch 76. Data input port 48 couples to a latch 80, which is configured to receive and retain data written therein by computer 34 (see FIG. 1). One set of output bits from latch 80 couples to band and channel selection inputs of tuner circuit 72. Thus, such output bits control the selection of a frequency band and channel which are demodulated by tuner circuit 72. Another output bit from latch 80 couples to a control input of switch 76. Thus, this bit controls the selection of either computer-based audio signals or audio signals originating from LVN 28. A third signal port of switch 76, which receives the selected audio signal, couples through an amplifier 82 to audio headset 40 and optionally to monitor 38 (see FIG. 1).

The preferred embodiment of the present invention assumes that video monitors 38 are all color monitors which receive both conventional composite video input and RGB video input, along with a control signal to specify which one of the two video inputs to display. A model PVM-1390 Color Video Monitor manufactured by the Sony Corporation represents one example of such a device. Consequently, MCU 36 couples computer video input port 50 to the RGB input of video monitor 38. A baseband video output of tuner circuit 72 couples to the composite video input of video monitor 38, and a control bit output from latch 80 serves as the control signal which specifies to video monitor 36 whether to display composite or RGB video.

However, those skilled in the art will recognize that MCU 36 may be adapted for use in association with other types of monitors. For example, a monitor which receives only composite video may be utilized by including a circuit (not shown) which converts the RGB video from computer video input 50 into a composite signal, then controlling a switch (not shown) to route either this converted video or the composite video output from tuner 72 to such a monitor. Likewise, a monitor which receives only video may be utilized by including a circuit (not shown) which converts the composite video output from tuner circuit 72 into a digitized signal, then controlling a plurality of switches (not shown) to route either this converted video or the computer video input 50 to such a monitor. Such conversion circuits are known to those skilled in the art.

In operation, digital data supplied to MCU 36 selects which video and corresponding audio signals to route to video monitor 38 and audio headset 40. Such digital data originates from a corresponding student computer 34 (see FIG. 1) operating in response to a configuration command issued by CDS 69 (see FIG. 1), as discussed above. A portion of such digital data specifies either computer-based video and audio or LVN-originated video and audio. When LVN-originated video and audio are specified, an additional portion of such data specifies which band and channel to demodulate in order to obtain baseband video and audio.

In summary, the present invention provides an automated classroom 10 which distributes both video instructional materials and computer-based instructional materials to students. Classroom 10 integrates the video and computer-based instructional materials together so that lessons may include portions from both types of instructional material. Moreover, classroom 10 provides a distributed system in which all students in classroom 10 may have their own workstations. Consequently, all students may receive unique instructional materials which are tailored to their own specific needs and progress at their own pace. Hence, learning is individualized, personalized, and interactive. While classroom 10 is a distributed system, it nevertheless includes a CDS 69 through which the instructional materials may be managed. As a result, an instructor becomes more of a manager of instructional materials and facilitator of learning, less of a direct presenter of instructional materials, and less of a computer operator.

The present invention has been described above with reference to a preferred embodiment. However, those skilled in the art will recognize that changes and modifications may be made in this preferred embodiment without departing from the scope of the present invention. For example, the file server database described above could be included within an instructor or student workstation. In addition, any number of instructor workstations and student workstations may couple together so that the automated classroom discussed herein may be partitioned into multiple sub-classrooms. Moreover, only minor modifications are required to drive the above-described MCU 36 with a serial data port of computers 34 and 58. These and other changes and modifications which are obvious to those skilled in the art are intended to be included within the scope of the present invention.

What is claimed is:

1. An information distribution system for the presentation and management of instructional materials, said system comprising:

a plurality of workstations for presenting and managing instructional materials, each of said workstations having a computer with a video output, a single video monitor coupled to said video output of said computer, and video switching means coupled between said computer and said video monitor, wherein said video switching means comprises:

a tuner having a video input, a control input, and a video output, said video output being coupled to said video monitor for said workstation, and a data port having an input coupled to said computer for said workstation and an output coupled to said control input of said tuner, said data port being configured to receive control data which identify one of a plurality of video channels;

a data network for transmission of computer data among said workstations, said data network being coupled to each of said computers of said workstations;

a file server means coupled to said data network, said filer server means being configured to store and supply instructional computer programs to said workstations; and a video network for transmission of a plurality of video signals from a video source means to said workstations, said video network being coupled to said tuner video input of each of said workstations, and said video network being configured to simultaneously transmit said plurality of video signals over said plurality of video channels.

2. An information distribution system as claimed in claim 1 wherein said video network is additionally configured for the transmission of audio signals to said workstations.

3. An information distribution system as claimed in claim 2 wherein each of said workstations additionally comprises an audio headset coupled to said video switching means, said audio headset being for producing audible sounds corresponding to said audio signals.

4. An information distribution system as claimed in claim 1 wherein each of said plurality of video channels carries a modulated video signal, and said video source means comprises:

a plurality of video sources configured to produce a corresponding plurality of demodulated video signals; and means, coupled to each of said plurality of video sources and to said video network, for modulating said demodulated video signals to produce said modulated video signals and for applying said modulated video signals to said video network so that each of said plurality of modulated video signals is carried in its own unique one of said video channels by said video network.

5. An information distribution system as claimed in claim 1 wherein:

each of said plurality of video channels of said video network is additionally configured for the transmission of audio signals;

each of said workstations additionally comprises an audio headset coupled to said video switching means; and said tuner has an audio output coupled to said headset, said audio headset being for producing audible sounds corresponding to said audio signals.

6. An information distribution system as claimed in claim 1 wherein said file server means comprises a curriculum delivery system coupled to said data network, wherein:

each of said workstation computers is configured to receive first control data from said curriculum delivery system through said data network;

said data port is configured to receive second control data from said computer; and said first and second control data permit management of video information presented at said video monitor by said curriculum delivery system.

7. An information distribution system as claimed in claim 1 wherein:

each of said workstation computers is configured to receive first control data from said file server means through said data network;

said data port is configured to receive second control data from said computer; and said first and second control data together control the display of video information at said video monitor to originate from one of said video network and said computer.

8. An information distribution system as claimed in claim 1 wherein said video switching means of each of said workstations are substantially identical to one another.

9. An information distribution system as claimed in claim 1 wherein said data network comprises a local area network.

* * * * *